(12) United States Patent
Janmey

(10) Patent No.: US 6,270,919 B1
(45) Date of Patent: Aug. 7, 2001

(54) ELECTROCHEMICAL CELL HAVING LOW PROFILE SEAL ASSEMBLY WITH ANTI-RESEALING VENT

(75) Inventor: Robert M. Janmey, Olmsted Township, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/300,413

(22) Filed: Apr. 27, 1999

(51) Int. Cl.⁷ ...................................... H01M 2/12
(52) U.S. Cl. .............................................. 429/56
(58) Field of Search .................... 429/53–56, 64, 429/72, 82, 171, 172, 7, 174, 185; 29/623.1

(56) References Cited

U.S. PATENT DOCUMENTS

| | | |
|---|---|---|
| 3,314,824 * | 4/1967 | Spanur . |
| 5,589,293 | 12/1996 | Pope et al. ............................ 429/172 |
| 5,667,912 | 9/1997 | Georgopoulos ...................... 429/170 |
| 5,750,283 | 5/1998 | DePalma et al. ...................... 429/56 |

* cited by examiner

Primary Examiner—Carol Chaney
Assistant Examiner—Susy Tsang
(74) Attorney, Agent, or Firm—Stewart A. Fraser

(57) ABSTRACT

A low profile seal assembly for sealing the open end of a container of an electrochemical cell to provide controlled pressure venting, while effectively preventing resealing of the open end of the cell. An electrochemical cell has a container with a closed bottom and an open top end, positive and negative electrodes disposed in the container, a separator disposed between the positive and negative electrodes, and an electrolyte disposed in the container. The cell further includes a seal member disposed in the open top end of the container for closing the open top end of the container. The seal member has a stress concentrator formed in the seal member for providing pressure relief to vent high pressure gases. A cover is disposed in the open end of the container and substantially covers the seal member, and the cover has at least one opening formed therein. A standoff member is located between a top surface of the seal member and a bottom surface of the cover for keeping at least a portion of the seal member at a distance from the cover to prevent resealing of the seal member when the seal member vents.

22 Claims, 3 Drawing Sheets

US 6,270,919 B1

ELECTROCHEMICAL CELL HAVING LOW PROFILE SEAL ASSEMBLY WITH ANTI-RESEALING VENT

BACKGROUND OF THE INVENTION

The present invention generally relates to electrochemical cells and, more particularly, to a low profile seal assembly for sealing the open end of a cell container and having a pressure release mechanism for venting when exposed to excessive pressure.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. The cathode is typically formed against the interior surface of the steel can, while the anode is generally centrally disposed in the can. Alternately, in jelly-roll cells, the anode and cathode are spirally wound. A separator is located between the anode and the cathode, and an alkaline electrolyte solution simultaneously contacts the anode, the cathode, and the separator. A conductive current collector is commonly inserted into the anode active material, and a seal assembly, which includes a seal member, provides closure to the open end of the steel can to seal the active electrochemical materials in the sealed volume of the can.

Cylindrical alkaline cells are commonly sealed closed by placing an annular nylon seal above a bead in the open end of the steel can and crimping the upper end of the can inwardly and over the outer periphery of the seal to compress the seal against the bead. However, electrochemical cells commonly employ electrochemically active materials, such as zinc, which generate hydrogen gas during storage and sometimes during or following service use. When the can is sealed closed, excessive build-up of high pressure gases within the sealed can may cause damage to the cell and/or the device in which the cell is employed.

One approach to avoiding a potentially excessive build-up of pressure in a cell has been to employ a resealable valve system that periodically releases excessive gas pressure from within the active cell volume. However, the continued periodic release of gas pressure may, in some situations, permit the release of electrolyte solution containing salts or other particulate matter, which may foul the resealable valve, and generally requires additional costly components. Another approach to avoiding excessive build-up of pressure involves employing a sealed membrane that is intended to blowout when exposed to excessive pressure either by puncture or rupture of the membrane itself. Puncture mechanisms such as a spiked member may be employed to punch a hole in the sealed membrane once the pressure reaches a predetermined amount. Alternately, a rupture mechanism may be employed in the form of a thin membrane which ruptures when the internal pressure of the cell becomes too great.

Other approaches to venting excessive pressure have included the use of a vent formed in the seal which is intended to rupture upon experiencing an excessive pressure build-up in the cell. For example, U.S. Pat. No. 5,667,912 discloses a current collector assembly having a low profile seal with a thinned portion which is intended to shear when the internal pressure exceeds a predetermined pressure. The disclosure of U.S. Pat. No. 5,667,912 is hereby incorporated by reference.

When the seal has a thinned portion or other stress concentration vent formed axisymmetrically about a complete 360 degree rotation of the cell's central longitudinal axis, a potential problem may exist in that the vent, when completely activated, may force the vented diaphragm portion of the seal outward throughout the full 360 degree rotation. If a cover is located close enough to the venting seal, it is possible that the vented seal diaphragm may make contact with the surface of the cover with such force that a pressure-holding seal is made. The resealing of the cell during a 360 degree vent condition may result in the build-up of an excessive pressure beyond which the cell was intended to operate. In this circumstance and when excessive pressure is experienced, the crimp formed at the rim of the can may be forced to release and thereby open the cell's container. Accordingly, it is therefore desirable to provide for an electrochemical cell having a low profile seal assembly that effectively vents, when necessary, and prevents resealing of the seal member.

SUMMARY OF THE INVENTION

The present invention improves the protective safeguards of an electrochemical cell with an enhanced low profile seal assembly for sealing the open end of the electrochemical cell's container to provide controlled pressure venting, while effectively preventing resealing of the vent mechanism. To achieve this and other advantages, and in accordance with the purpose of the invention as embodied and described herein, the present invention provides for an electrochemical cell having a container with a closed bottom end and an open top end, positive and negative electrodes disposed in the container, a separator disposed between the positive and negative electrodes, and an electrolyte disposed in the container. The cell further includes a seal member disposed in the open top end of the container for closing the open top end of the container. The seal member has a stress concentrator formed in the seal member for providing pressure relief to vent high pressure gases. A cover is disposed in the open end of the container and substantially covers the seal member, and the cover has at least one opening formed therein. A standoff member is located between a top surface of the seal member and a bottom surface of the cover for keeping at least a portion of the seal member at a distance from the cover to prevent resealing of the seal member when the seal member vents.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
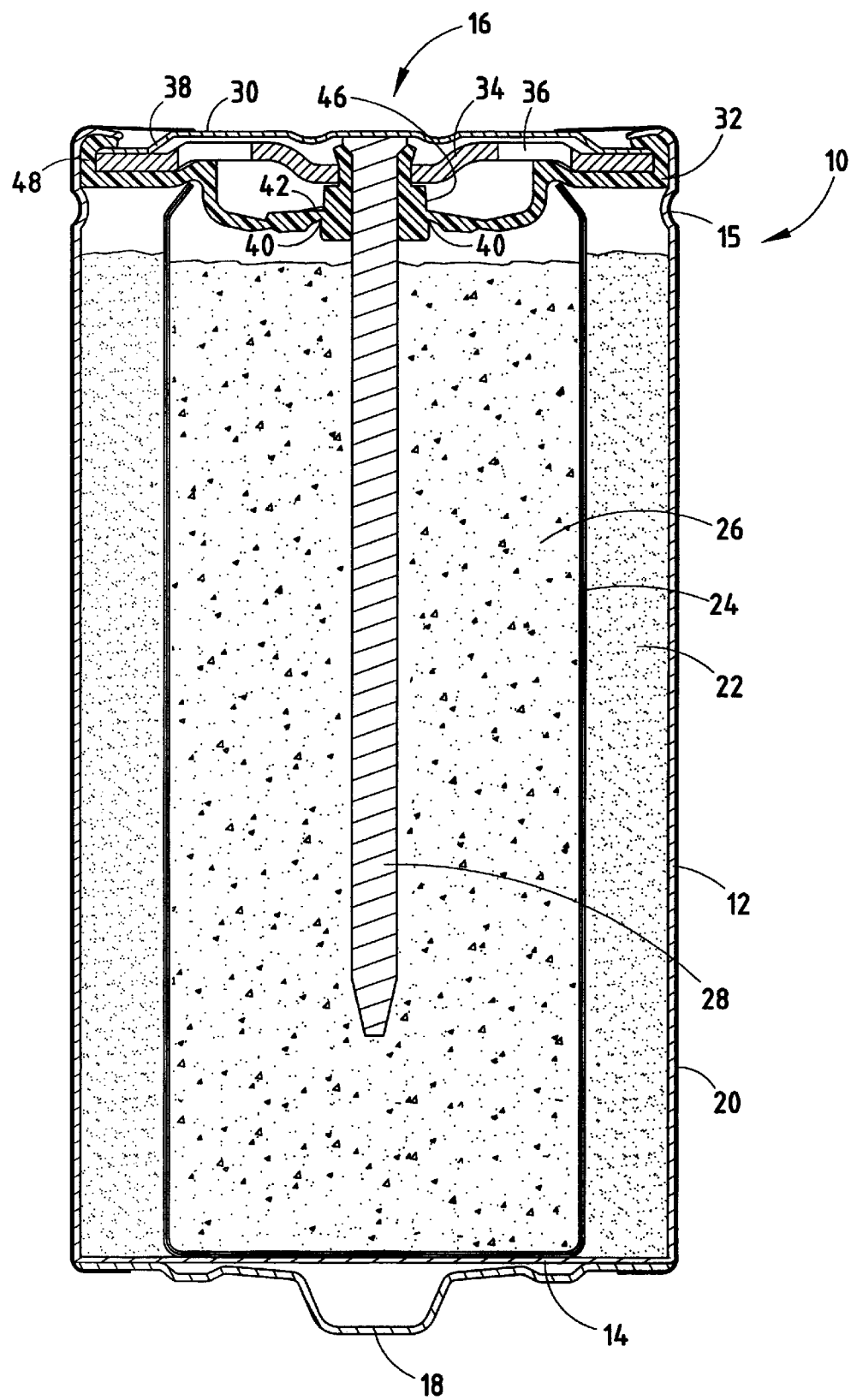
FIG. 1 is a longitudinal cross-sectional view of an electrochemical cell having a seal assembly including a pressure release vent with anti-resealing, shown in a non-vented condition.

Referring to FIG. 1, a cylindrical alkaline electrochemical cell 10 is shown therein. Electrochemical cell 10 includes a cylindrical steel can 12 having a closed bottom end 14 and an open top end 16. The closed bottom end of can 12 further includes a positive cover welded or otherwise attached thereto and formed of plated steel, with a protruding nub 18 at its center region, which forms the positive contact terminal of cell 10. Assembled to the open top end 16 of steel can 12 is a cover and seal assembly with an outer negative cover 30 which forms the negative contact terminal of cell 10. A metalized, plastic film label 20 is formed about the exterior surface of steel can 12, except for the ends of steel can 12. Film label 20 is formed over the peripheral edge of the positive cover and may extend partially onto the negative cover as shown.

A cathode, preferably formed of a mixture of manganese dioxide, graphite, potassium hydroxide solution, and additives, is formed about the interior surface of steel can 12. A separator 24, which is preferably formed of a non-woven fabric that prevents migration of any solid particles in the cell, is disposed about the interior surface of cathode 22. An anode 26, preferably formed of zinc powder, a gelling agent, and additives, is disposed with an electrolyte inside the separator 24 and in contact with a current collector 28 which may include a brass nail having an elongated body and an enlarged head at one end. Accordingly, the cathode 22 is configured as the cell's positive electrode, and the anode 26 is configured as the cell's negative electrode.

The current collector 28 contacts the outer negative cover 30 which forms the negative contact terminal of cell 10. The outer negative cover 30 is preferably formed of plated steel, and may be held in contact with current collector 28 via pressure contact or a weld. An annular nylon seal 32 is disposed in the open end of steel can 12 to prevent leakage of the electrochemically active cell materials contained in steel can 12. An inner cover 34, which is preferably formed of a rigid metal, is provided to increase the rigidity and support the radial compression of nylon seal 32, thereby improving the sealing effectiveness. The inner cover 34 is configured to contact the central hub portion 46 and peripheral upstanding wall 48 of seal 32, and has one or more vent openings, i.e., apertures 36, formed through the inner cover 34. The seal 32, inner cover 34, and outer negative cover 30 provide a low profile closure to the open end 16 of can 12. In addition, the outer negative cover 30 also includes one or more vent openings 38 that serve to expose the non-sealed volume of cell 10 to the surrounding outside atmosphere. Vent openings 36 and 38 serve to vent pressure build-up from within the cell 10 to the outside atmosphere when the seal 32 vents.

Together, the current collector 28, nylon seal 32, and inner cover 34 form a collector and seal assembly that can be inserted as a unit into the open end 16 of steel can 12 to seal the active ingredients within the active cell volume. The assembly of the collector and seal assembly and closure of the open end includes disposing the nylon seal 32 on top of a bead 15 formed radially inward on the inner wall of the can 12, and crimping the upper end of the can 12 inwardly and over the outer periphery of the seal 32 to compress it against the bead 15. Therefore, the nylon seal 32 is compressed against the inner cover 34. It should also be appreciated that the outer negative cover 30 is electrically insulated from the steel can 12 by way of nylon seal 32.

According to the present invention, the nylon seal 32 has a stress concentration vent, formed as a thinned section 40, which acts as a pressure relief mechanism when exposed to an excessive pressure differential. The thinned section 40 has an axisymmetric shape, i.e., it is symmetric about the central longitudinal axis of cell 10, and is intended to fracture when exposed to a predetermined pressure differential to release high pressure gas from within the sealed active volume of cell 10. Thinned section 40 is formed adjacent to central hub 46 and, upon fracturing, a pliable inner disk portion 45 of seal 32 is intended to be forced upward to release high pressure gases, which may then exit cell 10 via apertures 36 and 38 formed in inner cover 34 and outer cover 30, respectively.

Figure 2:
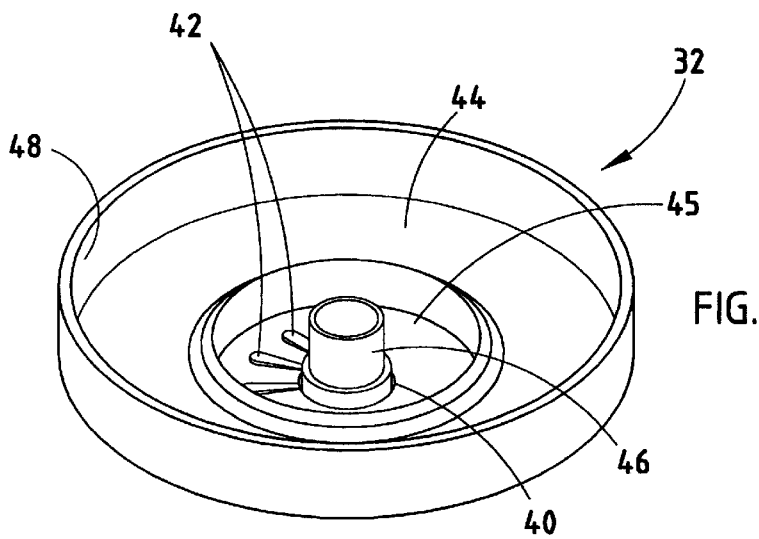
FIG. 2 is an elevated perspective view of a seal having a plurality of standoff ribs formed on an upper surface according to one embodiment of the present invention.
Figure 3:
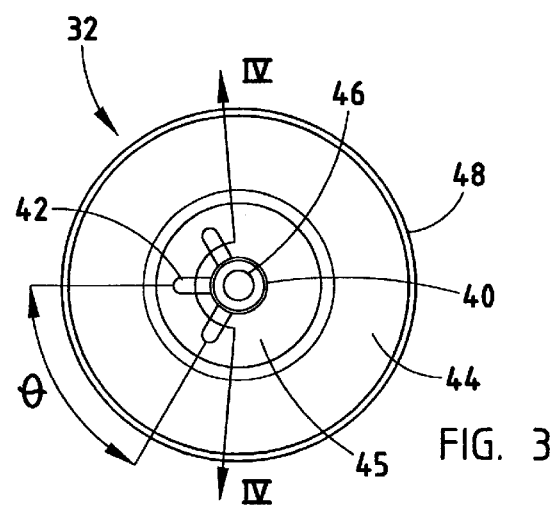
FIG. 3 is a top plan view of the seal shown in FIG. 2.

Referring to FIGS. 2 and 3, seal 32 is shown according to one embodiment of the present invention having a plurality of standoff members for preventing resealing of the seal 32 with the inner cover 34. Seal 32 has a flat planar disk-like portion 44 adjacent to outer peripheral upstanding wall 48 and a lowered inner disk portion 45 adjacent to central hub 46. Inner portion 45 includes the thinned section 40 and is pliable and intended to bend outward when thinned section 40 ruptures to vent. According to the embodiment shown therein, seal 30 has three raised ribs 42 formed on the top surface region 45 of seal 32 which serve as standoff members between seal 32 and inner cover 34 to prevent resealing of seal 32 with inner cover 34 during a venting condition. Ribs 42 extend radially and are formed adjacent to and preferably overlap thinned section 40. Ribs 42 may be further molded to the peripheral surface of central hub 46, thereby increasing the strength of thinned section 40 at each location of radial ribs 42 which may, in some situations, prevent the occurrence of a full 360 degree blowout of the thinned section which, in effect, will prevent resealing of seal 32 with inner cover 34.

Figure 4:
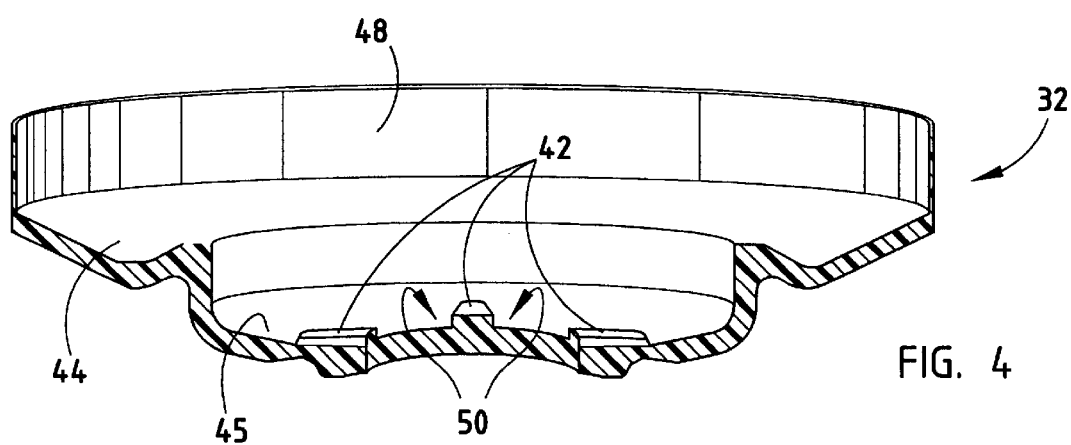
FIG. 4 is an enlarged cross-sectional view taken through lines IV—IV in FIG. 3, which further illustrates the standoff ribs.

With particular reference to FIG. 3, three ribs 42 are shown equi-angularly spaced from one another by an angle θ, which is preferably equal to approximately sixty degrees. Accordingly, the three ribs 42 are equi-angularly located within a 120 degree arc. Referring further to FIG. 4, provided between adjacent ribs 42 are channels 50 which serve to provide a pressure relief opening in the event that seal 32 fractures and is forced into contact with inner cover 34. While three ribs 42 separated by sixty degrees are shown according to the preferred embodiment, it should be appreciated that one or more ribs may be employed and that other angles of separation may be used according to other embodiments.

According to one embodiment, seal member 32 is made of nylon, such as ZYTEL® 101F which is commercially available from E.I. duPont deNemours and Co. Inc. Seal member 32 can be integrally formed to include the thinned portion 40 and standoff ribs 42 using a conventional injection molding process. It should be appreciated that while nylon is a preferred material, other polymeric or other seal materials could be used. In addition, the bottom surface of seal member 32 may be coated with a layer of asphalt (not shown) to prevent chemical degradation of the seal member 32 due to the presence of electrolyte.

Figure 5:
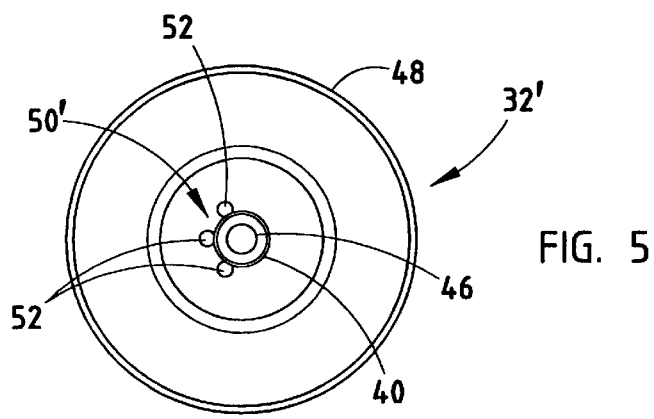
FIG. 5 is a top plan view of the seal having a plurality of standoff posts according to another embodiment of the present invention.

Referring to FIG. 5, a seal 32' is shown according to another embodiment having three vertical posts 52 formed adjacent to and partly over thinned section 40 which serve as the standoff member between seal 32' and inner cover 34.

Posts 52 are shown having a cylindrical base and extend upwardly to provide channels 50' between adjacent posts 52. While three posts 52 are shown, one or more posts may be employed to prevent resealing of the seal 32' with inner cover 34. In addition, one or more radial rows of posts may be employed to form a radial rib made up of adjacent posts. It should be appreciated that yet other configurations and different size standoff members may be disposed between seal 32 or 32' and inner cover 34 to provide one or more channels to prevent resealing of the seal 32 or 32' with inner cover 34 during a venting condition. It should also be appreciated that the standoff members can be formed on the bottom of inner cover 34, or otherwise fabricated as a groove or channel in the bottom surface of inner cover 34 or top surface of seal 32 or 32', without departing from the spirit of the present invention.

Figure 6:
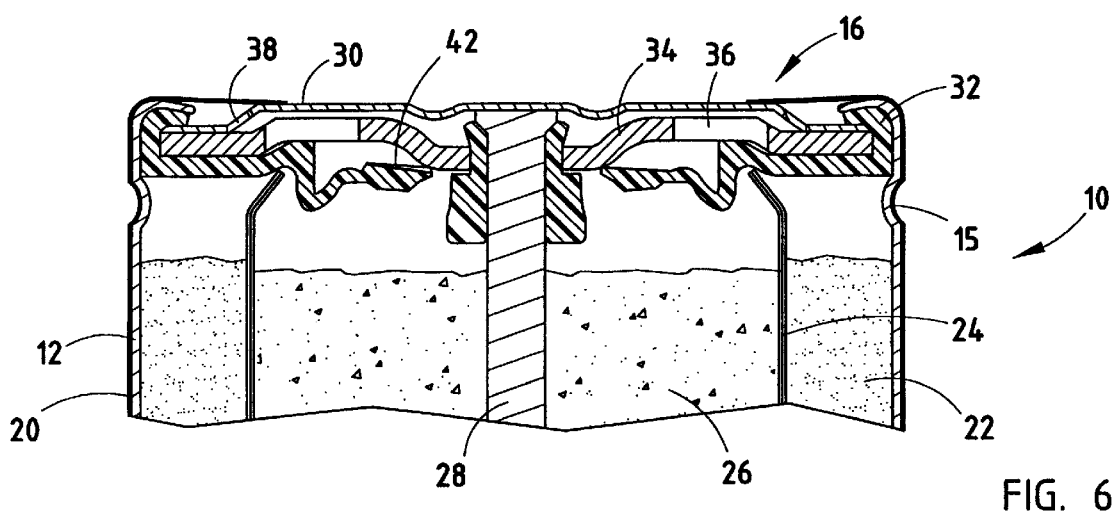
FIG. 6 is a longitudinal cross-sectional view of the electrochemical cell of FIG. 1 further shown in a pressure release venting condition.

Referring to FIG. 6, the electrochemical cell 10 is further shown during a venting condition of the cell 10 in which the thinned section 40 has fractured to release high pressure gas from within the cell 10. During the venting condition, the standoff members 42 or 52 serve to separate at least a portion of seal 32 from inner cover 34 to prevent resealing therebetween. As a consequence, pressure from within the vented cell 10 is released to the outer atmosphere through channels 50 or 50' between adjacent standoff members and exits from the cell 10 to the surrounding environment through apertures 36 and 38.

Figure 7:
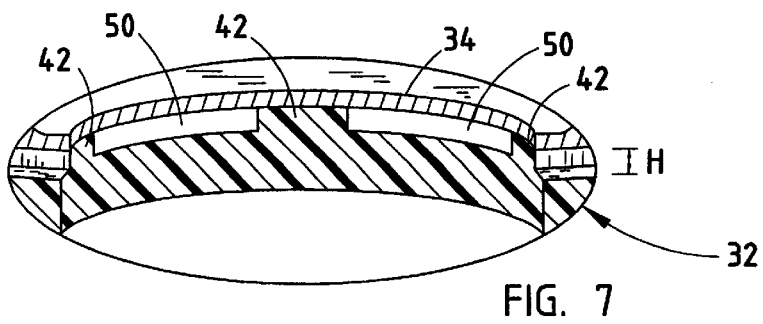
FIG. 7 is an exploded cross-sectional view taken through the seal and inner cover as shown in FIG. 6 during the pressure release venting condition.

Referring further to FIG. 7, the standoff ribs 42 are further shown adjacent to and contacting the bottom surface of inner cover 34 during the venting condition. At the same time, channels 50 provide gas release passages through which pressurized gas may be released from the cell 10 while preventing resealing of the seal 32 with inner cover 34. The standoff ribs 42 or 52 preferably have a height H in the range of at least 5 to 7 mils extending above inner disk portion 45 of seal 32; however, the size and shape of the standoff member may vary depending on the material and pressure. Accordingly, the present invention advantageously prevents resealing of the seal member 32 during a high pressure vent condition, which advantageously prevents or reduces can crimp releases.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container having a closed bottom end and an open top end;
   a positive electrode disposed in said container;
   a negative electrode disposed in said container;
   a separator disposed between said positive electrode and said negative electrode;
   an electrolyte disposed in said container;
   a seal member disposed in the open top end of said container for closing said open top end of said container, said seal member having a stress concentrator formed about a central longitudinal axis of said cell for providing pressure release to vent gases;
   a cover disposed in said open end of said container and substantially covering said seal member, said cover having at least one opening formed therein; and
   a standoff member disposed between a top surface of said seal member and a bottom surface of said cover for distancing at least a portion of said seal member from said cover to prevent resealing of said seal member when said seal member vents, wherein said standoff member comprises at least one post formed on the top surface of said seal member.

2. An electrochemical cell comprising:
   a container having a closed bottom end and an open top end;
   a positive electrode disposed in said container;
   a negative electrode disposed in said container;
   a separator disposed between said positive electrode and said negative electrode;
   an electrolyte disposed in said container;
   a seal member disposed in the open top end of said container for closing said open top end of said container, said seal member having a stress concentrator formed about a central longitudinal axis of said cell for providing pressure release to vent gases;
   a cover disposed in said open end of said container and substantially covering said seal member, said cover having at least one opening formed therein; and
   a standoff member disposed between a top surface of said seal member and a bottom surface of said cover for distancing at least a portion of said seal member from said cover to prevent resealing of said seal member when said seal member vents, wherein said standoff member comprises at least one rib formed on the top surface of said seal member.

3. The electrochemical cell as defined in claim 2, wherein said standoff member comprises three ribs.

4. The electrochemical cell as defined in claim 3, wherein said three ribs are angularly spaced sixty degrees apart from one another.

5. An electrochemical cell comprising:
   a container having a closed bottom end and an open top end;
   a positive electrode disposed in said container;
   a negative electrode disposed in said container;
   a separator disposed between said positive electrode and said negative electrode;
   an electrolyte disposed in said container;
   a seal member disposed in the open top end of said container for closing said open top end of said container, said seal member having a stress concentrator formed about a central longitudinal axis of said cell for providing pressure release to vent gases;
   a cover disposed in said open end of said container and substantially covering said seal member, said cover having at least one opening formed therein; and
   a standoff member disposed between a top surface of said seal member and a bottom surface of said cover for distancing at least a portion of said seal member from said cover to prevent resealing of said seal member when said seal member vents, wherein said standoff member has a height of at least 5 mils.

6. An electrochemical cell comprising:
   a container having a closed bottom end and an open top end;
   a positive electrode disposed in said container;
   a negative electrode disposed in said container;
   a separator disposed between said positive electrode and said negative electrode;
   an electrolyte disposed in said container;

a seal member disposed in the open top end of said container for closing said open top end of said container, said seal member having a stress concentrator formed about a central longitudinal axis of said cell for providing pressure release to vent gases;

a cover disposed in said open end of said container and substantially covering said seal member, said cover having at least one opening formed therein; and a standoff member disposed between a top surface of said seal member and a bottom surface of said cover for distancing at least a portion of said seal member from said cover to prevent resealing of said seal member when said seal member vents, wherein said standoff member comprises polymeric material.

7. The electrochemical cell as defined in claim 6, wherein said stress concentrator comprises a substantially circular groove formed axisymmetrical about a central longitudinal axis of said cell.

8. The electrochmical cell as defined in claim 6, wherein said cell further comprises a current collector assembled with said seal member to form a collector assembly.

9. A method for assembling an electrochemical cell comprising the steps of:

providing a container having a closed bottom end and an open top end;

disposing a positive electrode in said container;

disposing a negative electrode in said container;

disposing a separator between said positive electrode and said negative electrode;

disposing an electrolyte in said container;

providing a seal member having a stress concentrator formed in the seal member about a central longitudinal axis of said cell;

disposing said seal member in the open top end of said container for closing said open top end of said container;

disposing a cover in said open top end of said container and over said seal member, said cover having at least one opening formed therein; and providing a standoff member disposed between a top surface of said seal member and a bottom surface of said cover for keeping at least a portion of said seal member distanced from said cover to prevent resealing of said seal member during can venting, wherein said step of providing a standoff member comprises forming at least one rib on the top surface of said seal member.

10. The method as defined in claim 9 further comprising the step of forming said stress concentrator as a groove formed axisymmetrical about a central longitudinal axis of said cell.

11. An electrochemical cell comprising:

a container having a closed bottom and an open top end;

a positive electrode disposed in said container;

a negative electrode disposed in said container;

a separator disposed between said positive electrode and said negative electrode;

an electrolyte disposed in said container;

a seal member disposed in the open top end of said container for closing said open top end of said container, said seal member having a stress concentrator formed about a central longitudinal axis of said cell for providing pressure release to vent gases;

a cover disposed in said open end of said container and overlying at least a portion of said seal member, said cover having a bottom surface facing said seal member, said cover further having at least one opening formed therein; and a standoff member disposed between a top surface of said seal member and the bottom surface of said cover for distancing at least a portion of said seal member from said cover to prevent resealing of said seal member when said seal member vents, wherein said standoff member comprises at least one rib formed on the top surface of said seal member.

12. The electrocemical cell as defined in claim 11, wherein said stress concentrator comprises a groove formed substantially axisymmetrical about a central longitudinal axis of said cell.

13. An electrochemical cell comprising:

a container having a closed bottom end and an open top end;

a positive electrode disposed in said container;

a negative electrode disposed in said container;

a separator disposed between said positive electrode and said negative electrode;

an electrolyte disposed in said container;

a seal member disposed in the open top end of said container for closing said open top end of said container, said seal member having a stress concentrator formed about a central longitudinal axis of said cell for providing pressure release to vent gases;

a cover disposed in said open end of said container and substantially covering said seal member, said cover having at least one opening formed therein; and a standoff member disposed between a top surface of said seal member and a bottom surface of said cover for distancing at least a portion of said seal member from said cover to prevent resealing of said seal member when said seal member vents, wherein said standoff member extends from the top surface of said seal member and is adjacent to said stress concentrator.

14. An electrochemical cell comprising:

a container having a closed bottom and an open top end;

a positive electrode disposed in said container;

a negative electrode disposed in said container;

a separator disposed between said positive electrode and said negative electrode;

an electrolyte disposed in said container;

a seal member disposed in the open top end of said container for closing said open top end of said container, said seal member having a stress concentrator formed about a central longitudinal axis of said cell for providing pressure release to vent gases;

a cover disposed in said open end of said container and overlying at least a portion of said seal member, said cover having a bottom surface facing said seal member, said cover further having at least one opening formed therein; and a standoff member disposed between a top surface of said seal member and the bottom surface of said cover for distancing at least a portion of said seal member from said cover to prevent resealing of said seal member when said seal member vents, wherein said standoff member comprises at least one post formed on the top surface of said seal member.

15. An electrochemical cell comprising:

a container having a closed bottom and an open top end;

a positive electrode disposed in said container;

a negative electrode disposed in said container;

a separator disposed between said positive electrode and said negative electrode;

an electrolyte disposed in said container;

a seal member disposed in the open top end of said container for closing said open top end of said container, said seal member having a stress concentrator formed about a central longitudinal axis of said cell for providing pressure release to vent gases;

a cover disposed in said open end of said container and overlying at least a portion of said seal member, said cover having a bottom surface facing said seal member, said cover further having at least one opening formed therein; and a standoff member disposed between a top surface of said seal member and the bottom surface of said cover for distancing at least a portion of said seal member from said cover to prevent resealing of said seal member when said seal member vents, wherein said seal member and said standoff member comprise polymeric material.

16. A seal assembly for sealing the open end of an electrochemical cell container, said seal assembly comprising:

a seal member adapted to be disposed in an open end of a container to provide a sealed closure to the open end of the container, said seal member having a stress concentrator formed about a central longitudinal axis of a cell container;

a cover overlying at least a portion of said seal member, said cover having at least one opening formed therein; and a standoff member disposed between a top surface of said seal member and a bottom surface of said cover for distancing at least a portion of said seal member from said cover to prevent resealing of said seal member during can venting, wherein said standoff member comprises a vertically extending member formed on the top surface of said seal adjacent to said stress concentrator.

17. A method for assembling an electrochemical cell comprising the steps of:

providing a container having a closed bottom end and an open top end;

disposing a positive electrode in said container;

disposing a negative electrode in said container;

disposing a separator between said positive electrode and said negative electrode;

disposing an electrolyte in said container;

providing a seal member having a stress concentrator formed in the seal member about a central longitudinal axis of said cell;

disposing said seal member in the open top end of said container for closing said open top end of said container;

disposing a cover in said open top end of said container and over said seal member, said cover having at least one opening formed therein; and providing a standoff member disposed between a top surface of said seal member and a bottom surface of said cover for keeping at least a portion of said seal member distanced from said cover to prevent resealing of said seal member during can venting, wherein said step of providing a standoff member comprises forming at least one post on the top surface of said seal member.

18. An electrochemical cell comprising:

a container having a closed bottom end and an open top end;

a positive electrode disposed in said container;

a negative electrode disposed in said container;

a separator disposed between said positive electrode and said negative electrode;

an electrolyte disposed in said container;

a seal member disposed in the open top end of said container for closing said open top end of said container, said seal member having a stress concentrator formed about a central longitudinal axis of said cell for providing pressure release to vent gases;

a cover disposed in said open end of said container and at least partially covering said seal member, said cover having at least one vent passage therein; and means for forming a passage between said seal member and said cover for preventing resealing of said seal member when the seal member vents, wherein said means for forming a passage comprises one or more standoff members formed on a surface of said seal member.

19. The electrochemical cell as defined in claim 18, wherein said stress concentrator comprises a groove formed substantially axisymmetrical about a central longitudinal axis of said cell.

20. A seal assembly for sealing the open end of an electrochemical cell container, said seal assembly comprising:

a seal member adapted to be disposed in an open end of a container to provide a sealed closure to the open end of the container, said seal member having a stress concentrator formed about a central longitudinal axis of a cell container;

a cover overlying at least a portion of said seal member, said cover having at least one opening formed therein; and a standoff member disposed between a top surface of said seal member and a bottom surface of said cover for distancing at least a portion of said seal member from said cover to prevent resealing of said seal member during can venting, wherein said standoff member comprises at least one rib formed on the top surface of said seal member.

21. The seal assembly as defined in claim 20, wherein said standoff member comprises three ribs.

22. The seal assembly as defined in claim 20, wherein said three ribs are angularly spaced sixty degrees apart from one another.

* * * * *